United States Patent
Pang et al.

(10) Patent No.: US 9,404,393 B2
(45) Date of Patent: Aug. 2, 2016

(54) COMBINED CYCLE POWER PLANT

(75) Inventors: Raymond Pang, Schenectady, NY (US); Raub Warfield Smith, Ballston Lake, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1154 days.

(21) Appl. No.: 13/071,118

(22) Filed: Mar. 24, 2011

(65) Prior Publication Data
US 2012/0240549 A1 Sep. 27, 2012

(51) Int. Cl.
*F01K 13/02* (2006.01)
*F01K 23/10* (2006.01)
*F22B 37/02* (2006.01)

(52) U.S. Cl.
CPC .......... *F01K 13/02* (2013.01); *F01K 23/10* (2013.01); *F01K 23/108* (2013.01); *F22B 37/025* (2013.01); *Y02E 20/16* (2013.01)

(58) Field of Classification Search
CPC ..... F01K 23/10; F01K 23/106; F01K 17/025; F02C 6/18; Y02E 20/16; Y02E 20/18; F22B 1/1815
USPC ............ 60/39.182, 772, 773, 784, 793, 39.5, 60/770, 39.3, 660, 661, 662, 663, 685, 60/686, 653, 654, 679; 122/7 R, 7 B
See application file for complete search history.

(56) References Cited

U.S. PATENT DOCUMENTS

| | | | | |
|---|---|---|---|---|
| 3,760,869 A | * | 9/1973 | Brown | 165/122 |
| 4,745,757 A | * | 5/1988 | Kim | 60/667 |
| 4,841,722 A | * | 6/1989 | Bjorge | 60/39.182 |
| 4,976,100 A | * | 12/1990 | Lee | 60/772 |
| 5,237,816 A | * | 8/1993 | Duffy et al. | 60/39.182 |
| 5,269,130 A | * | 12/1993 | Finckh et al. | 60/772 |
| 5,623,822 A | * | 4/1997 | Schuetzenduebel et al. | 60/39.182 |
| 6,237,321 B1 | | 5/2001 | Schmid et al. | |

(Continued)

FOREIGN PATENT DOCUMENTS

| | | |
|---|---|---|
| EP | 0588392 A1 | 3/1994 |
| FR | 2409379 A1 | 6/1979 |

(Continued)

OTHER PUBLICATIONS

Unofficial English Translation of Russian Notice of Allowance issued in connection with corresponding RU Application No. 2012112442 on Jan. 11, 2016.

(Continued)

*Primary Examiner* — Phutthiwat Wongwian
*Assistant Examiner* — Rene Ford
(74) *Attorney, Agent, or Firm* — Dority & Manning, PA

(57) ABSTRACT

A combined cycle power plant in which a gas turbine engine generates power, a heat recovery steam generator (HRSG) produces steam from high energy fluids produced from the generation of power in the gas turbine engine and a steam turbine engine generates additional power from the steam produced in the HRSG. The combined cycle power plant includes a heating element fluidly interposed between the steam turbine engine and the HRSG to heat fluid output from the steam turbine engine, which is to be fed to the HRSG and a control system to control an amount the fluid output from the steam turbine engine is heated by the heating element based on differences between HRSG and ambient temperatures.

17 Claims, 1 Drawing Sheet

(56) References Cited

U.S. PATENT DOCUMENTS

| | | | | |
|---|---|---|---|---|
| 6,474,069 | B1* | 11/2002 | Smith | 60/727 |
| 6,494,045 | B2* | 12/2002 | Rollins, III | 60/773 |
| 6,508,206 | B1* | 1/2003 | Rechtman | 122/7 R |
| 6,604,354 | B2* | 8/2003 | Oto et al. | 60/39.182 |
| 6,792,759 | B2* | 9/2004 | Rollins, III | 60/773 |
| 6,901,348 | B2* | 5/2005 | Smith et al. | 702/182 |
| 7,040,095 | B1* | 5/2006 | Lang | 60/653 |
| 7,168,233 | B1* | 1/2007 | Smith et al. | 60/39.182 |
| 7,478,524 | B2* | 1/2009 | Kreitmeier | 60/39.182 |
| 7,814,742 | B2* | 10/2010 | Yoshida | 60/39.464 |
| 2003/0182944 | A1* | 10/2003 | Hoffman et al. | 60/772 |
| 2007/0017207 | A1* | 1/2007 | Smith et al. | 60/39.182 |
| 2007/0204623 | A1* | 9/2007 | Rollins, III | 60/772 |
| 2009/0260585 | A1* | 10/2009 | Hack et al. | 122/7 R |
| 2011/0000220 | A1 | 1/2011 | Hibshman, II | |
| 2012/0255303 | A1* | 10/2012 | Labbe | 60/653 |

FOREIGN PATENT DOCUMENTS

| | | |
|---|---|---|
| RU | 2144994 C1 | 1/2000 |
| RU | 2152527 C1 | 7/2000 |
| RU | 2208685 C2 | 7/2003 |
| WO | 9631685 A1 | 10/1996 |

OTHER PUBLICATIONS

French Search Report and Written Opinion issued in connection with corresponding FR Application No. 1252471 on Dec. 16, 2015.

* cited by examiner

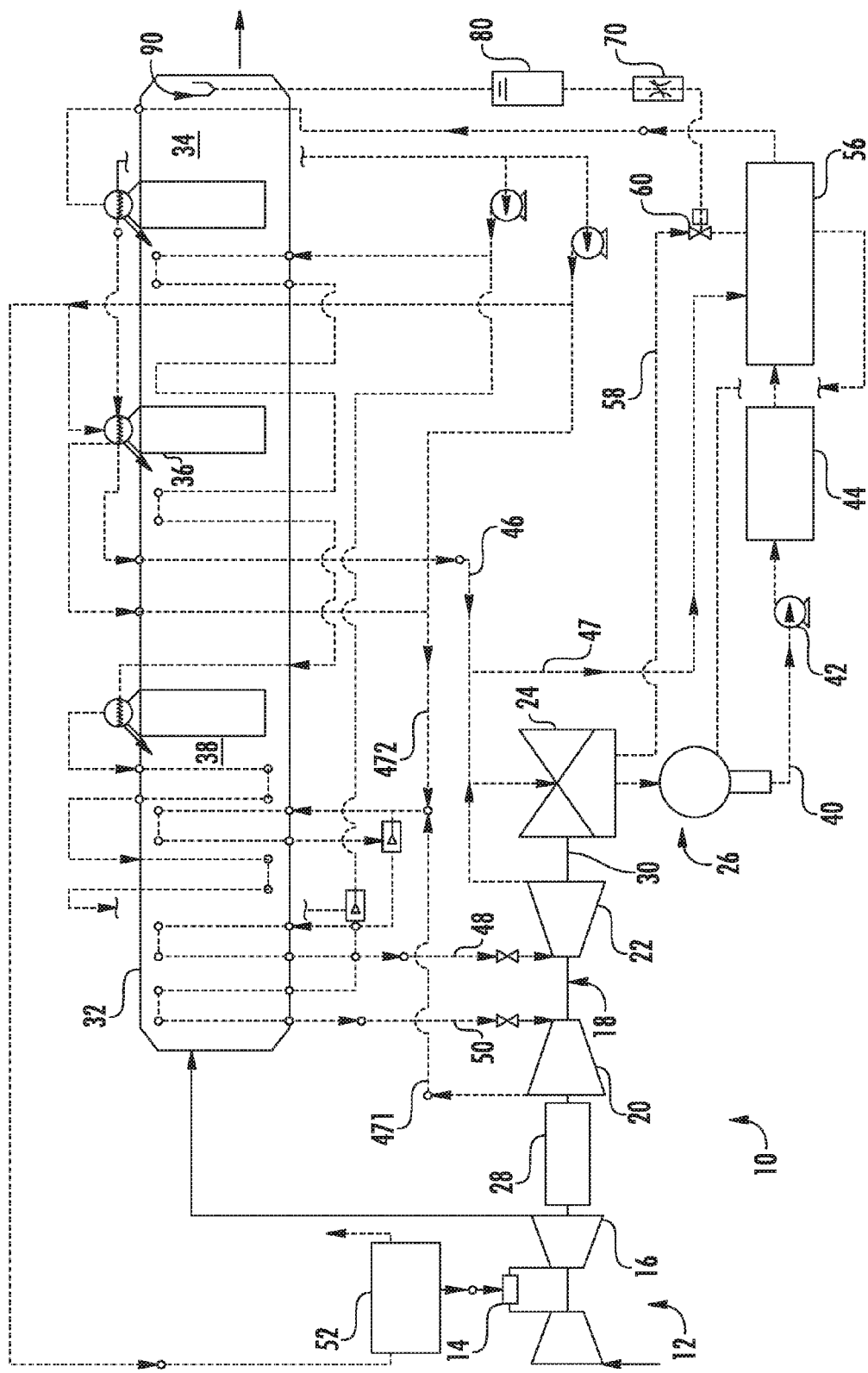

COMBINED CYCLE POWER PLANT

BACKGROUND OF THE INVENTION

The subject matter disclosed herein relates to active stack temperature management via controlled steam extracted in a combined cycle power plant.

A combined cycle power plant utilizes a gas turbine engine and a steam turbine engine in combination to produce power. The power plant is arranged such that the gas turbine engine is thermally connected to the steam turbine engine through a heat recovery steam generator ("HRSG"). The HRSG is a non-contact heat exchanger that allows feedwater for the steam generation process to be heated by otherwise wasted gas turbine engine exhaust gases. The HRSG is a large duct with tube bundles interposed therein such that water is heated to steam as the exhaust gases pass through the duct.

Modern combined cycles typically employ two (2) or three (3) steam generation pressures to recover energy from the gas turbine engine exhaust. These cycles also often include water supply temperature controls to maintain the tubes above the water dew point so as to avoid potential corrosion. Such cycles may set HRSG exit gas temperatures as low as about 150° Fahrenheit (about 66° Celsius) while, in some instances, a higher HRSG exit gas temperature is required. For example, a higher HRSG exit gas temperature may be required in accordance with local regulations to allow for a lower cost (shorter) stack but can result in an unavoidable performance reduction associated with recovery of less exhaust energy.

Higher HRSG exit gas temperatures have been previously achieved by reduction of low pressure surface area because the low pressure steam production thus sacrificed has the lowest potential to make work. By contrast, in a recent attempt to solve this problem, a low pressure steam extraction pipe and condensate feedwater heater achieve the required HRSG exhaust gas temperature across an ambient temperature range but, in this case, the hottest temperature in the ambient range tends to drive the design specifications for the extraction pipe and the condensate feedwater heater. Thus, at colder ambient temperatures, this recent arrangement would cause the HRSG exhaust gas temperature to tend to increase above the temperature requirement thus reducing thermal efficiency beyond what is required.

BRIEF DESCRIPTION OF THE INVENTION

According to one aspect of the invention, a combined cycle power plant is provided in which a gas turbine engine generates power, a heat recovery steam generator (HRSG) produces steam from high energy fluids produced from the generation of power in the gas turbine engine and a steam turbine engine generates additional power from the steam produced in the HRSG and includes a heating element fluidly interposed between the steam turbine engine and the HRSG to heat fluid output from the steam turbine engine, which is to be fed to the HRSG and a control system to control an amount the fluid output from the steam turbine engine is heated by the heating element based on differences between HRSG and ambient temperatures.

According to another aspect of the invention, a combined cycle power plant is provided and includes a gas turbine engine to generate power, a heat recovery steam generator (HRSG) to produce steam from high energy fluids produced from the generation of power in the gas turbine engine, a steam turbine engine to generate additional power from the steam produced in the HRSG, a heating element fluidly interposed between the steam turbine engine and the HRSG to heat fluid output from the steam turbine engine, which is to be fed to the HRSG and a control system to control an amount the fluid output from the steam turbine engine is heated by the heating element based on differences between an HRSG gas exit temperature and an inputted temperature setpoint.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the sole accompanying drawing, which is:

A schematic illustration of a combined cycle power plant.

The detailed description explains embodiments of the invention, together with advantages and features, by way of example with reference to the drawing.

DETAILED DESCRIPTION OF THE INVENTION

Referring now to the sole drawing, a combined cycle power plant 10 is provided. The power plant 10 includes a gas turbine engine system 12 with a combustion system 14 and a turbine section 16. The power plant 10 further includes a steam turbine engine system 18. The steam turbine engine system 18 includes a high pressure section 20, an intermediate pressure section 22 and one or more low pressure sections 24 with multiple steam admission points at the different pressures. The low pressure section 24 exhausts into a condenser 26. The steam turbine engine system 18 drives a generator 28 that produces electrical power. The gas turbine engine system 12, the steam turbine engine system 18 and the generator 28 may be arranged on a single shaft 30. Other configurations may be used.

The steam turbine engine system 18 is associated with a multi-pressure heat recovery steam generator (HRSG) 32. The HRSG 32 is a counter flow heat exchanger in which feedwater that passes through the HRSG 32 is heated as exhaust gas output from the gas turbine engine system 12, gives up heat and becomes cooler. The HRSG 32 has three (3) different operating pressures (high, intermediate, and low) with components to generate steam at the various pressures and temperatures. This steam is used as vapor feed to the corresponding stages of the steam turbine engine system 18. The HRSG 32 may include, for example, a lower pressure section 34, an intermediate pressure section 36 and a high pressure section 38, each of which may generally include one or more economizers, evaporators and/or superheaters.

Condensate is fed from the condenser 26 to the HRSG 32 via one or more conduits 40 with the aid of a condensate pump 42. A gland seal condenser 44 disposed downstream from the condensate pump 42 also may be used for secondary condensing operations. The condensate subsequently passes from the condensate pump 42 through the low pressure section 34 of the HRSG 32. In a known manner, steam from the low pressure section 34 is fed to the low pressure section 24 of the steam turbine system 18 via a conduit 46. Condensate and/or feedwater pass through the intermediate section 36 and are returned to the intermediate pressure section 22 of the steam turbine system 18 via a conduit 48. Finally, condensate is passed through the high pressure section 38 of the HRSG 32 and is returned to the high pressure section 20 of the steam turbine system 18 via a conduit 50. Hot water produced via the HRSG 32 also may be used for a fuel heating system 52.

In addition, a heating element, such as a low pressure extraction feedwater heater 56, is provided. The feedwater heater 56 is positioned about the conduit 40 and is operably disposed downstream from the condenser 26. A further conduit 58, such as a low pressure steam extraction pipe, may directly connect the feedwater heater 56 to the low pressure section 24 of the steam turbine engine system 18 whereby low pressure steam is extracted from the low pressure section 24 of the steam turbine engine system 18, fed to the feedwater heater 56 and thus employed to raise the temperature of the condensate being fed to the HRSG 32. The feedwater heater 56 thus tends to increase the supply temperature of the condensate to the HRSG 32.

A valve 60, such as a proportional valve or some other similar type of valve, is provided along the further conduit 58 to control an amount of the low pressure steam extracted from the low pressure section 24 of the steam turbine engine system 18. The valve 60 is operated by a control system including a valve actuator 70, a processing unit 80 and a temperature sensor 90. The valve actuator 70 is operably coupled to the processing unit 80. The processing unit 80 receives HRSG temperature measurements, such as HRSG exhaust gas temperature measurements, from the temperature sensor 90, such as a thermocouple operably disposed within the HRSG 32.

In cases where it is desirable to modulate the HRSG exhaust gas temperature to a setpoint that is higher than the naturally occurring temperature absent any mechanism for active temperature control, such as where a minimum HRSG exhaust gas temperature is defined by local regulations, the processing unit 80 compares the measured HRSG exhaust gas temperature to the an inputted temperature setpoint and/or a desired temperature setpoint and transmits a control signal, such as a proportional valve modulation signal, to the valve actuator 70 based on results on that comparison. The valve actuator 70 then opens or closes the valve 60 to control low pressure steam extraction accordingly.

While the feedwater heater 56 is designed such that a minimum HRSG exhaust gas temperature can be achieved across a given range of ambient temperatures, the minimum HRSG exhaust gas temperature would typically occur on the hottest day in the ambient range and, at every colder ambient temperature, the low pressure steam extraction would tend to be excessive without appropriate control of the valve 60 as provided by the control system described herein. A result of excessive low pressure steam extraction may be that the HRSG exhaust gas temperature would tend to increase above the required minimum thereby reducing thermal efficiency of the combined cycle power plant 10. However, since the valve 60 as controlled by the processing unit 80 is able to modulate the low pressure steam extraction such that only the minimum required amount of low pressure steam is extracted to maintain the HRSG exhaust gas temperature above the required minimum for a given day having a given ambient temperature, such as the inputted temperature setpoint, the remaining flow will expand through the low pressure section 24 of the steam turbine system 18 thus increasing thermal efficiency of the combined cycle power plant 10.

In accordance with alternative embodiments, the steam for use in the feedwater heater 56 may be extracted from the high or intermediate pressure sections 20, 22 of the steam turbine engine system 18. Another alternative would be to have the processing unit 80 infer the HRSG exhaust gas temperature based on a low pressure economizer inlet temperature with a relationship between the low pressure economizer inlet temperature and the HRSG gas exhaust temperature understood. The processing unit 80 would then transmit the flow modulation signal based on the low pressure economizer inlet temperature.

Still other alternative embodiments include the addition of valves and conduits or the modification of existing valves and conduits to bypass the steam turbine engine system 18. In these embodiments, extracted steam for use in the feedwater heater 56 is drawn from conduits 46, 48 and 50 directly. For example, FIG. 1 illustrates a conduit 47 that extends from the conduit 46 to the feedwater heater 56, thereby bypassing the steam turbine engine system 18. Also, after steam exits the high pressure section 20 of the steam turbine engine system 18, the steam proceeds through a cold reheat pipe 471 and merges with intermediate pressure superheated steam from conduit 472. Extracted steam from either cold reheat pipe 471 or conduit 472 could also be used to supply the feedwater heater 56.

The feedwater heater 56 can be provided in any heat exchanging configuration and may incorporate additional or alternative heating elements.

In accordance with further aspects of the invention, a method of operating a combined cycle power plant 10 is provided. The method includes directing condensed low pressure steam, from the steam turbine engine system 18 and the condenser 26 toward the HRSG 32, heating the condensed low pressure steam prior to the admission thereof into the HRSG 32 and controlling an amount of the heating of the condensed low pressure steam. The heating is achieved by exposing in a feedwater heater 56 the condensed turbine exhaust to an amount of low pressure steam, which is extracted from the steam turbine engine system 18. The controlling, as described above, is achieved by modulating the amount of the low pressure steam to which the condensed turbine exhaust is exposed based on a comparison of a temperature measurement of the HRSG 32, an ambient temperature measurement and a predefined temperature setting, which may be defined in accordance with the ambient temperature measurement.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant, comprising:
   a gas turbine engine to generate power;
   a heat recovery steam generator (HRSG) to produce steam from high energy fluids produced from the generation of power in the gas turbine engine;
   a steam turbine engine to generate additional power from the steam produced in the HRSG;
   a heating element fluidly interposed between the steam turbine engine and the HRSG to heat fluid output from the steam turbine engine, which is to be fed to the HRSG, the heating element being configured for maintenance of an HRSG exhaust gas temperature that is above a required temperature based on a high end of an ambient temperature range;

a first conduit extending from the HRSG to the steam turbine engine;

a second conduit extending from the first conduit to the heating element for extracting an amount of steam from the first conduit and delivering the amount of steam to the heating element, wherein the amount of stem flowing through the second conduit to the heating element bypasses the steam turbine engine; and a control system to control an amount by which the fluid that is output from the steam turbine engine is heated by the heating element based on differences between an HRSG gas exit temperature and an inputted temperature setpoint such that the heating element operates below design capabilities in maintaining the HRSG exhaust gas temperature above the required temperature based on an ambient temperature being lower than the high end of the ambient temperature range.

2. The combined cycle power plant according to claim 1, wherein the heating element comprises a low pressure steam extraction feedwater heater.

3. The combined cycle power plant according to claim 1, wherein the fluid output from the steam turbine engine is output from a low pressure section of the steam turbine engine.

4. The combined cycle power plant according to claim 1, further comprising:
  a condenser fluidly interposed between the steam turbine engine and the heating element to initially condense the fluid output from the steam turbine engine; and
  a condensate pump to pump the condensed fluid from the condenser toward the heating element.

5. The combined cycle power plant according to claim 1, further comprising:
  a steam extraction pipe to extract steam from the steam turbine engine and to deliver the extracted steam to the heating element; and
  a valve operably disposed along the steam extraction pipe to control an amount of the extracted steam flown to the heating element.

6. The combined cycle power plant according to claim 5, wherein the steam extraction pipe extracts steam from a low pressure section of the steam turbine engine.

7. The combined cycle power plant according to claim 1, wherein the control system comprises:
  a temperature sensor to determine the HRSG gas exit temperature; and
  a processing unit to compare the HRSG gas exit temperature with an inputted temperature setpoint and to issue a control signal to control the amount the fluid output from the steam turbine engine is heated in accordance with a result of the comparison.

8. The combined cycle power plant according to claim 7, where the HRSG gas exit temperature comprises an inferred exhaust gas temperature.

9. The combined cycle power plant according to claim 7, wherein the temperature sensor is operably disposed in the HRSG.

10. The combined cycle power plant according to claim 7, further comprising a valve actuator operably disposed to control the valve in response to the control signal.

11. A combined cycle power plant, comprising:
  a gas turbine engine to generate power;
  a heat recovery steam generator (HRSG) to produce steam from high energy fluids produced from the generation of power in the gas turbine engine;
  a steam turbine engine to generate additional power from the steam produced in the HRSG;
  a heating element fluidly interposed between the steam turbine engine and the HRSG to heat fluid output from the steam turbine engine, which is to be fed to the HRSG, the heating element being configured for maintenance of an HRSG exhaust gas temperature that is above a required temperature based on a high end of an ambient temperature range;
  a first conduit extending from the HRSG to the steam turbine engine;
  a second conduit extending from the first conduit to the heating element for extracting an amount of steam from the first conduit and delivering the amount of steam to the heating element, wherein the amount of steam flowing through the second conduit to the heating element bypasses the steam turbine engine; and
  a control system to control an amount by which the fluid that is output from the steam turbine engine is heated by the heating element based on differences between HRSG and ambient temperature such that the heating element operates below design capabilities in maintaining the HRSG exhaust gas temperature above the required temperature based on an ambient temperature being lower than the high end of the ambient temperature range.

12. The combined cycle power plant according to claim 11, wherein the heating element comprises a low pressure steam extraction feedwater heater.

13. The combined cycle power plant according to claim 11, further comprising:
  a steam extraction pipe to extract steam from the steam turbine engine and to deliver the extracted steam to the heating element; and
  a valve operably disposed along the steam extraction pipe to control an amount of the extracted steam flowing to the heating element.

14. The combined cycle power plant according to claim 13, wherein the steam extraction pipe extracts steam from a low pressure section of the steam turbine engine.

15. The combined cycle power plant according to claim 14, wherein the control system comprises:
  a temperature sensor to determine an HRSG gas exit temperature; and
  a processing unit to compare the HRSG gas exit temperature with an inputted temperature setpoint and to issue a control signal to control the amount the fluid output from the steam turbine engine is heated in accordance with a result of the comparison.

16. The combined cycle power plant according to claim 15, wherein the HRSG gas exit temperature comprises one or more of an exhaust gas temperature and an inferred exhaust gas temperature.

17. The combined cycle power plant according to claim 15, further comprising a valve actuator operably disposed to control the valve in response to the control signal.

* * * * *